BEST AVAILABLE COPY

BEST AVAILABLE COPY

April 5, 1927.

Re. 16,588

W. C. HADLEY

PHONOGRAPH RECORD

Original Filed July 20, 1921 3 Sheets-Sheet 1

INVENTOR
Walter C. Hadley
BY
Ray Belmont Whitman
ATTORNEY

April 5, 1927.

Re. 16,588

W. C. HADLEY

PHONOGRAPH RECORD

Original Filed July 20, 1921 3 Sheets-Sheet 2

INVENTOR
Walter C. Hadley
BY
Ray Belmont Whitman
ATTORNEY

April 5, 1927.

W. C. HADLEY

PHONOGRAPH RECORD

Original Filed July 20, 1921 3 Sheets-Sheet 3

Re. 16,588

INVENTOR
Walter C. Hadley
BY
Ray Belmont Whitman
ATTORNEY

41

Reissued Apr. 5, 1927. Re. 16,588

UNITED STATES PATENT OFFICE.

WALTER C. HADLEY, OF NEW YORK, N. Y., ASSIGNOR, BY MESNE ASSIGNMENTS, TO COLUMBIA PHONOGRAPH COMPANY, INC., BRIDGEPORT, CONNECTICUT, A CORPORATION OF NEW YORK.

PHONOGRAPH RECORD.

Original No. 1,456,434, dated May 22, 1923. Serial No. 486,150, filed July 20, 1921. Application for reissue filed May 6, 1925. Serial No. 28,521.

The present invention relates to phonograph records and more particularly to phonograph records provided with means co-operating with the tone-arm to actuate the brake or stop. Said means, in addition to this braking function, also serves as a silent-groove-ending for the record.

As is well known to those skilled in this art, many phonographs are equipped with "automatic stops," the one most generally employed comprising a rigid post projecting downwardly from the tone-arm in position to engage a trip or movable member which in turn operates a brake member. In such devices the movable member is set or adjusted for each record, such adjustment being determined by swinging the tone-arm inwardly and positioning the point of the needle approximately at the end of the reproducing surface on the record, and while the tone-arm is held in this position, the movable member of the automatic stop is set by being placed in contact with the rigid post projecting from the tone-arm. Of course in making this adjustment care must be taken to position the needle accurately with relation to the end of the reproducing surface of the record, but no matter how much care may be exercised, it is almost impossible to accurately position the end of the needle so as to effect the operation of the brake and stop at the desired point, and thus it happens that the stop will be operated at times before the end of the record is reached or for such a period thereafter as to produce a disagreeable scratching of the needle. In such devices also after setting the stop with the exercise of considerable care, the brake member makes a decided jump on the release in starting, thus the "set" point is advanced a varying distance; in most cases, several revolutions, which results many times in stopping before the end of the reproducing surface is reached, or if an effort be made to allow for the jump it may not stop soon enough after completing the record. It is quite difficult moreover to bring the rigid post on the tone-arm against the complementary part of the automatic stop in exactly the desired position and if the adjustment be most carefully made, it is often disarranged by the accidental movement of the tone-arm in starting the operation of the machine. As before stated, it is quite difficult to procure accurate, definite setting of the automatic stop and with the utmost care, the operation of the stop will vary many turns of the record because the variation in the construction of the stop in different machines of like make, due to the stiffness of action or wear of parts or otherwise, will cause a variation in the operation of the stop.

It has been proposed to provide phonograph records with a non-reproducing groove constituting a continuation of the groove of the reproducing surface of the record, such non-reproducing groove being at a different and sharper angle designed to impart a relatively quick movement inward of the needle and tone-arm and ending in a circular groove where no stop or brake is used, but such additional groove has been found to be ineffective unless the lines are relatively close together and it is found in practice that the needle constantly jumps out of the groove without operating the stop.

The object of the present invention is to provide a phonograph record which may be used on any of the well known phonograph machines provided with an automatic stop, so constructed that it may be possible to accurately set the stop mechanism to be operated at a definite point and having been once set it may be permanently locked and operate with any record embodying my invention no matter what the width of the reproducing surface may be.

Another object of the present invention is to provide a phonograph record with a stop actuating element so constructed and so positioned that regardless of the area covered by the reproducing surface, the universal stop will be operated positively and accurately in all such records shortly after the needle passes from the reproducing surface, and so that a plurality of records may be played without the necessity of resetting the stop mechanism after each record.

A further object is to provide a phonograph record with means whereby the needle after it leaves the reproducing surface will be given a relatively quick lateral movement towards the center of the record, thus moving the tone-arm and insuring the operation of the stop mechanism.

Still another, and a very important, object is to provide a phonograph record with means whereby the needle after it leaves the continuing spiral of the sound groove and has entered the inner or terminal-circle to which it connects, will be given a relatively quick lateral movement toward the center of the record, so that when the needle passes this point of intersection, between the spiral and circle, on the next succeeding revolution and thereafter, it will be spaced from said point of intersection, thus eliminating the objectionable clicking noise usual when the needle passes that point on all other records.

Still another object is to provide a terminal-groove, in a phonograph record, of such flat bottom contour or surface, that the relatively small area of the needle point need not track in one path, but will have a plurality of paths to wear down before breaking through the surface glaze and so spoiling the record.

Finally, an object is to provide a terminal-groove having a buttress inner-wall, for the purpose of preventing the needle from jumping out of the groove, and inwardly, on to the label or its adjacent surface.

To the above ends, the present invention consists of a record for sound reproduction having a section adapted to be engaged by a movable stylus and provided with sound reproducing means, and a combined stop-actuating and silent-groove-ending section adapted to receive the stylus after it passes from the first section, the stop-actuating silent-groove-ending section defining the limits of movement of the stylus within which limits the stylus is operative to actuate an automatic stop device; and it further consists of the devices and combinations of devices which will be hereinafter described and claimed.

The invention is illustrated in the accompanying drawings, in which--

Similar reference characters will be employed to designate corresponding parts.

Figure 1:
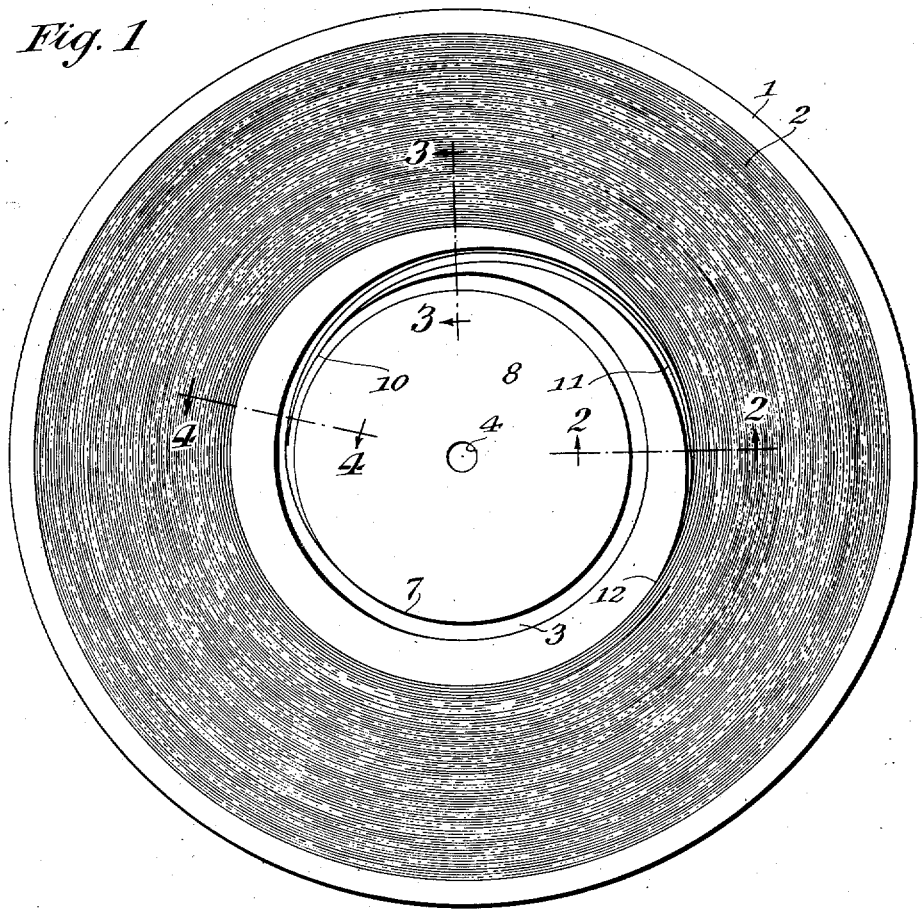
Fig. 1 shows a plan view of a disc record embodying the present invention.
Figure 2:
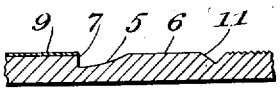
Fig. 2 is a section on the line 2—2 in Fig. 1.
Figure 3:
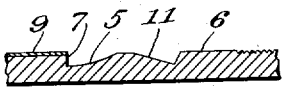
Fig. 3 is a section on the line 3—3 in Fig. 1.
Figure 4:
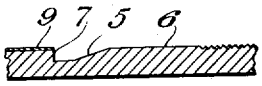
Fig. 4 is a section on the line 4—4 of Fig. 1.

In the drawings, I have illustrated my invention as applied to a disc record 1 having the usual grooved surface 2 constituting the sound reproducing surface, and as is well known to those skilled in this art, is in the form of grooves into which the point of the needle or stylus carried by the tone-arm of a phonograph is adapted to be engaged, and as such grooved lines are formed spirally, the rotation of the record 1 causes the needle or stylus and the tone-arm to gradually move from the outer periphery of the section 2 to the inner periphery thereof. This operation is well understood by those skilled in this art and need not be further set forth.

In all of the records illustrated no matter what may be the width of the reproducing section 2, it is intended that there shall be a stop actuating groove 3 positioned at the same point with relation to the central spindle opening 4. This groove is similar in every record and as shown, it is provided with a beveled surface 5 which leads in from the upper surface 6 of the record to a shoulder 7, which has a predetermined position, the same in all records. The shoulder 7 preferably defines the area of the central section 8 of the records. Usually the central section 8 is provided with a label 9 on which appears a suitable legend giving the name of the manufacturer and other information. The stop actuating groove 3 is a circular endless groove, but at some point in its circumferences, it is provided with an entrance 10 whereby the stylus may pass into the said groove. As soon as the stylus or needle thus passes into the actuating groove 3 and assuming that the automatic stop operated by the tone-arm has been properly set, the inclined surface 5 will impart a quick motion to the stylus and the tone-arm, the stylus moving towards the centre of the record and will actuate the automatic stop. Since the stylus moves toward the shoulder 7 as soon as it enters groove 3, it will not hit the point of intersection between the spiral and actuating grooves on succeeding revolutions of the record. The actuating groove 3 which may be defined as a stop or brake actuating section, or a silent-groove-ending section may be of any width and is of substantial width, so that it may form a guide readily discernible and found for setting the automatic stop, or for moving the needle an appreciable distance inwardly away from the point of intersection between the spiral and the circle. For if the point of the needle on the stylus is positioned at any point within the width of the actuating groove, and the brake or stop adjusted for operation with the needle within that width, then obviously no matter what the length of the record may be or what size or how wide the reproducing surface or section, if the needle or stylus be moved into the actuating groove or section, it will at once bring into operation the automatic stop. Obviously, the actuating groove may have its entrance 10 positioned in close proximity to the end of the reproducing surface or section 2 and the needle or stylus directed therein from the sound producing groove, but the actuating groove 3 may be made relatively narrow as shown and a leading-in groove 11 provided to engage the needle or stylus as it leaves the sound producing groove and quickly lead it through the opening 10 into the actuating groove 3.

Figure 5:
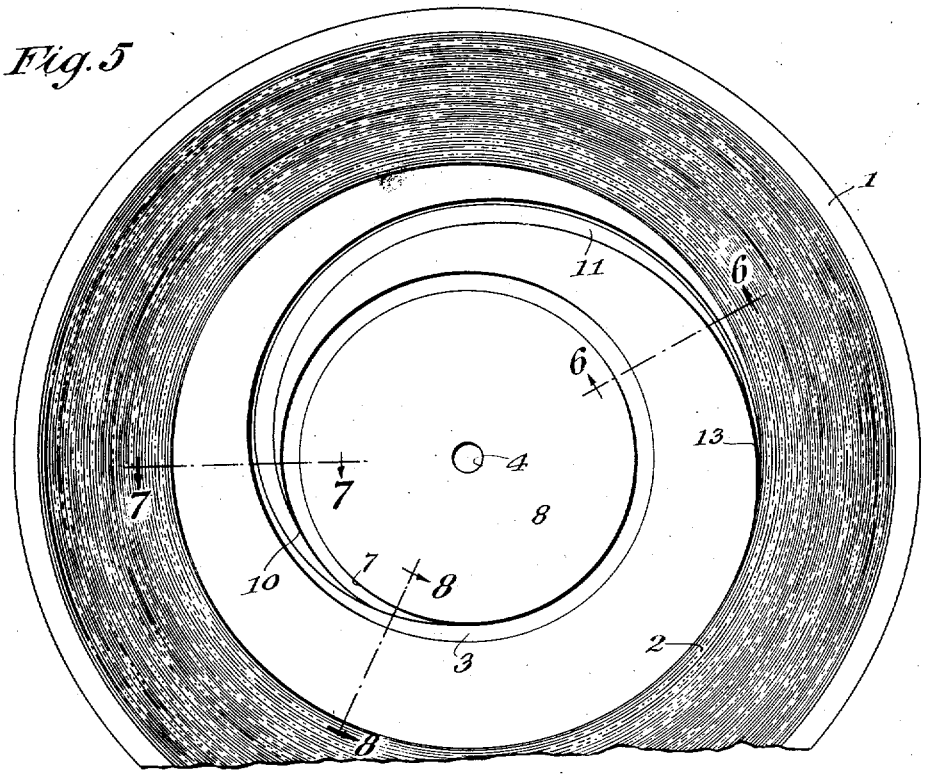
Fig. 5 is a top plan view of a slightly modified form, a portion of the record being broken away.

In Fig. 1 this leading-in groove 11 is shown as a relatively quick acting hook or horn which connects with the sound producing grooves at 12 and quickly leads the needle into groove 3 through the opening 10. In Fig. 5 the sound producing section 2 is relatively narrower than that shown in Fig. 1 and consequently the leading-in groove 11 will be a somewhat longer spiral hook or horn which at its outer end may be connected by a line or groove 13 with the sound producing groove surface 2.

Figure 9:
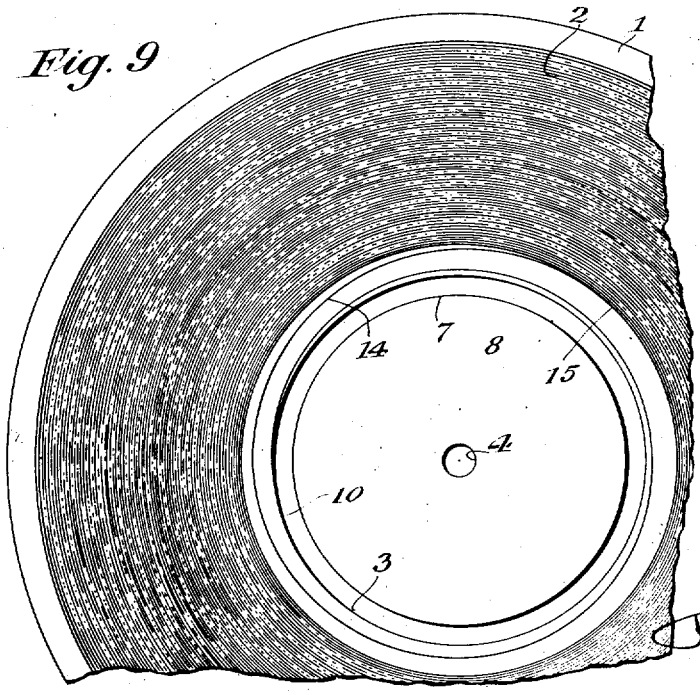
Fig. 9 is a top plan view of a portion of a disc record illustrating another modification.
Figure 6:
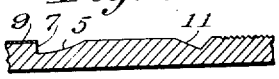
Fig. 6 is a section on the line 6—6 in Fig. 5.
Figure 7:
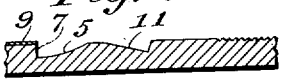
Fig. 7 is a section on the line 7—7 in Fig. 5.
Figure 8:
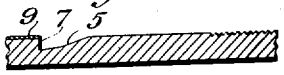
Fig. 8 is a section on the line 8—8 in Fig. 5.

In Fig. 9 means for leading the needle or stylus into the actuating groove 3 may be, as shown, a spiral groove 14 leading at 15 from the sound producing section 2 in a relatively quick spiral to the entrance 10 of the actuating groove 3.

Figure 10:
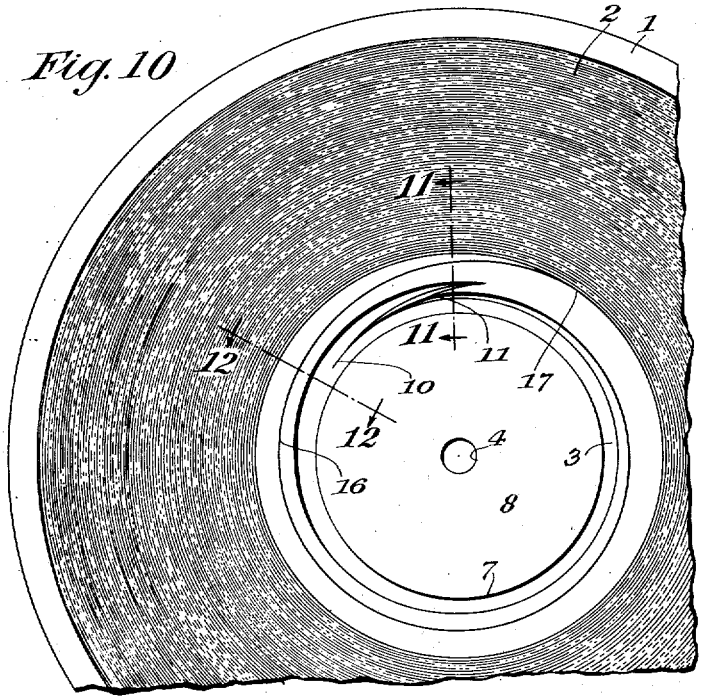
Fig. 10 is a top plan view of a disc record illustrating another modification.
Figure 11:
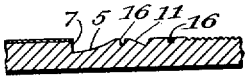
Fig. 11 is a section on the line 11—11 in Fig. 10.
Figure 12:
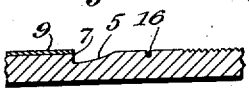
Fig. 12 is a section on the line 12—12 in Fig. 10.
Figure 14:
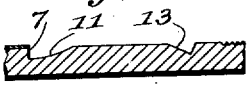
Fig. 14 is a section on the line 14—14 in Fig. 13.
Figure 13:
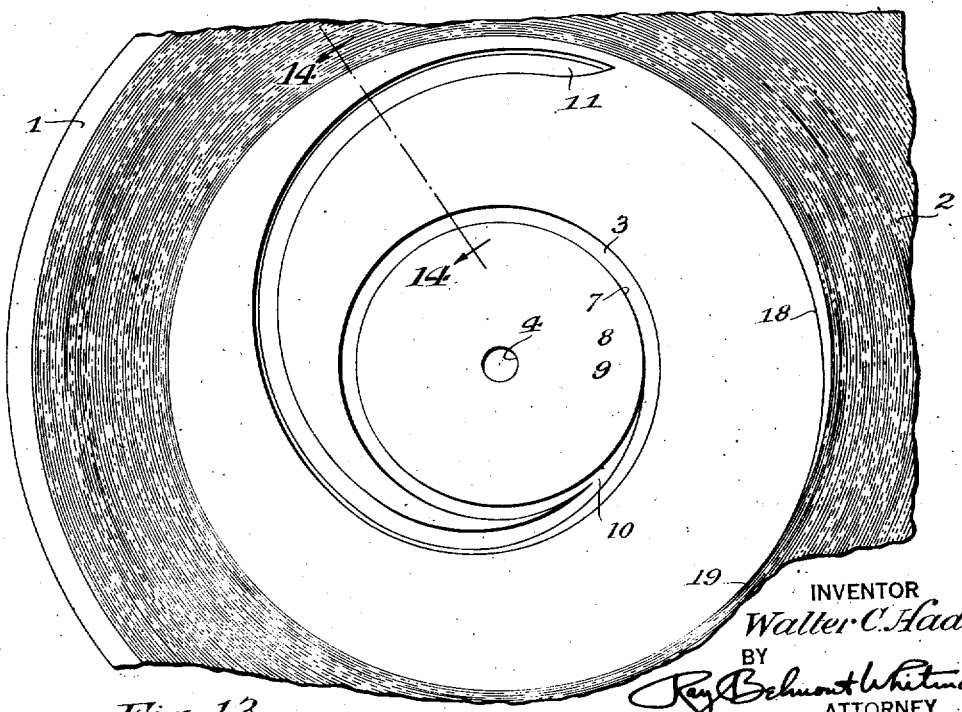
Fig. 13 is a top plan view of a portion of a disc record illustrating another modification.

In Fig. 10 the sound producing surface is relatively wide and a spiral groove 16 leading at 17 from the sound producing surface leads the needle into a relatively short leading-in groove 11. In Fig. 13 a groove 18 connects at 19 with the sound producing surface and leads the needle into such a position that it will be engaged by the spiral leading-in groove 11. In other words, while the groove 18 does not connect with the leading-in groove 11, yet it will place the point of the needle in such position that the leading-in groove 11 will engage it and throw it quickly into the actuating groove 3.

The above remarks apply with equal force when the invention is to be used solely as a silent-groove-ending for a record.

In operation—when used with a stop-actuating device—all that the operator need do is to place the point of the needle at any position in the groove 3, hold it there and set the automatic brake for operation at that point. Having set the brake, if a locking device is provided it may be locked or if a number of records having the present invention are to be played, the same adjustment will affect the operation of the brake in all records of this type and it will be unnecessary to reset the brake for a new record. This is an important advantage for obviously the actuating groove may be of varying widths and in all cases of relatively large area. Having positioned the needle and adjusted the stop or brake, when the needle passes off the reproducing surface, it will in a very short travel of the record be led into the actuating surface and the machine will be instantly stopped or within a very short interval after the sound ceases or after the needle passes off of the reproducing surface.

Its operation as a silent-groove-ending is entirely automatic, the operator having nothing to do whatever. The beveled relatively-wide inner-groove, heretofore referred to as the actuating groove, when entered by the needle after passing out of the spiral groove, causes the needle to immediately slide downwardly and inwardly away from this point of intersection, so that on each succeeding revolution, purely through the action of gravity, the needle point continues to seek the lower levels of this actuating groove, which are spaced from the point of intersection, and thus travels in the terminal circle without appreciable noise, until stopped.

Moreover, with so wide a groove, there is a minimum of friction, or noise-making engagement between the needle and the wall of the groove, and this appreciably reduces the unpleasant and objectionable continuous scraping sound between needle and record; and finally, since the bottommost parts of the groove are relatively flat, the needle has several paths to follow, which results in lessened wear on any one path; and this, by prolonging the life of the terminal circle by several times, offsets wholly, or to a large extent, its increased wear by virtue of increased use, particularly when not used in combination with the stop-actuating device, as here described, but solely for the function of a silent-groove-ending, which is perhaps its most common use.

While in every form of the device I have shown the actuating groove as relatively narrow and furthermore as provided with a leading-in groove, obviously assuming a relatively wide reproducing surface and a relatively wide actuating groove, the entrance leading from the reproducing surface to the actuating groove may lead directly therein.

The inner margin of the stop actuating groove presents a shoulder 7 which has a fixed and pre-determined position on all the records manufactured under the present invention. This shoulder permits the setting of the stop or brake with great ease even if the phonograph should be used in a dim light or in the dark, for it is easy to locate the proper position for the stylus to actuate the brake or stop by bringing the stylus into contact with the shoulder 7, then moving it a slight distance away from the same, and then setting the stop or brake. The shoulder has the additional function, and a most important one, of preventing the needle from jumping out of the groove, and inwardly on to the label or its adjacent surface, so acting as a safety measure against the mutilation of the label, for instance.

While there has been described and illustrated a particular embodiment of the invention, it is of course to be understood that the invention is not limited thereto, but comprehends anything and everything coming within the appended claims, and other modifications, details, and uses, which this disclosure might suggest to those skilled in the art, being considered a part of this invention.

What is claimed as new, and for which Letters Patent of the United States is desired, is the following:

1. In a record for sound reproduction, a section thereof adapted to receive a movable stylus and having predetermined limits, within which limits the stylus is operative to actuate an automatic stop device, said section having the bottom thereof inclined with respect to the plane of the record whereby it serves to give the stylus a rapid radial movement.

2. A record for sound reproduction, having a section adapted to be engaged by a movable stylus and provided with sound reproducing groove, and a section adapted to receive the stylus from said first section and having means for operating the stylus to actuate an automatic stop device, the said second section having a predetermined position with respect to said record, said means of said second section including an inclined surface and a marginal shoulder.

3. In a record for sound reproduction, a section thereof adapted to receive a movable stylus and having predetermined limits, within which limits the stylus is operative to actuate an automatic stop device, said section having the bottom thereof inclined with respect to the plane of the record whereby it serves to give the stylus a rapid radial movement, and a circular stop or shoulder adjoining the inner edge of the stop actuating section.

4. A phonograph record having a terminal circular groove, a leading-in groove connecting it with the sound recording grooves, the terminal groove being designed to receive and carry the needles at the end of the record, and including means to prevent the needle from contacting with the end of the leading-in groove as the record is revolved.

5. A phonograph record having a terminal circular groove, a leading-in groove connecting the terminal groove and sound grooves, said terminal groove provided with an inclined wall whereby the needle upon entering the terminal groove will move down said wall to a position where it cannot contact with the end of the connecting groove as the record is revolved.

6. As a new article of manufacture, a phonograph record including a body having a terminal groove provided with a substantially vertical side forming its inner wall, and a leading-in groove connecting said groove with the sound grooves.

7. A phonograph record including a body having a terminal circular groove provided with a substantially vertical inner wall and a sloping outer wall and a leading-in groove piercing said sloping wall and connected with the record grooves.

8. As a new article of manufacture, a phonograph record having a silent ending, said record having a terminal groove of greater width than its sound grooves, and having a leading-in groove extending from the valley of the last sound groove into the terminal groove.

9. As a new article of manufacture, a phonograph record having a terminal groove of great relative width to reduce the frictional contact with the needle and its consequent noise, said groove being connected with the sound grooves by a leading-in groove extending from the valley of the last sound groove.

Signed at New York, in the county and State of New York, this 28th day of April, A. D. 1925.

WALTER C. HADLEY.